United States Patent
Smith et al.

(10) Patent No.: US 9,227,684 B2
(45) Date of Patent: Jan. 5, 2016

(54) KNEE WALKER HAVING ENHANCED STEERING AND STABILITY

(71) Applicant: The Knee Walker Company, Inc., Altamonte Springs, FL (US)

(72) Inventors: Adrian L. Smith, Altamonte Springs, FL (US); Paul Smith, Paighton (GB)

(73) Assignee: The Knee Walker Company, Inc., Altamonte Springs, FL (US)

( * ) Notice: Subject to any disclaimer, the term of this patent is extended or adjusted under 35 U.S.C. 154(b) by 0 days.

(21) Appl. No.: 14/509,641

(22) Filed: Oct. 8, 2014

(65) Prior Publication Data

US 2015/0076780 A1    Mar. 19, 2015

Related U.S. Application Data

(63) Continuation-in-part of application No. 13/645,048, filed on Oct. 4, 2012, now Pat. No. 8,857,832.

(51) Int. Cl.

| | |
|---|---|
| *B62M 1/00* | (2010.01) |
| *B62K 5/08* | (2006.01) |
| *B62K 5/023* | (2013.01) |
| *B62K 5/003* | (2013.01) |
| *B62K 21/16* | (2006.01) |
| *A47D 13/04* | (2006.01) |
| *B62K 3/00* | (2006.01) |
| *B62D 3/02* | (2006.01) |
| *B62D 7/02* | (2006.01) |

(52) U.S. Cl.
CPC . *B62K 5/08* (2013.01); *B62K 5/003* (2013.01); *B62K 5/023* (2013.01); *B62K 21/16* (2013.01); *A47D 13/043* (2013.01); *B62D 3/02* (2013.01); *B62D 7/023* (2013.01); *B62K 3/002* (2013.01)

(58) Field of Classification Search
CPC ............ B62K 5/08; B62K 3/002; B62D 3/02; B62D 7/023; A47D 13/043
USPC .............................................. 280/267, 87.041
See application file for complete search history.

(56) References Cited

U.S. PATENT DOCUMENTS

| 692,725 | A | | 2/1902 | Simmons | |
|---|---|---|---|---|---|
| 3,669,466 | A | * | 6/1972 | Spence | 180/409 |
| 3,820,811 | A | * | 6/1974 | Iapham | 280/99 |

(Continued)

FOREIGN PATENT DOCUMENTS

| JP | 404071554 A | 3/1992 |
|---|---|---|
| WO | 2007065174 A | 6/2007 |

*Primary Examiner* — Anne Marie Boehler
*Assistant Examiner* — Marlon Arce
(74) *Attorney, Agent, or Firm* — Carl M. Napolitano; GrayRobinson, P.A.

(57) ABSTRACT

A knee walker includes a steering column rotatably attached to a forward portion of a frame, wherein the steering column includes a steering pulley rotatable about a vertically disposed axis of rotation. Two wheel assemblies are rotatably carried by the frame and have a pulley for rotating each assembly about a vertical axis. The axis of rotation of each wheel assembly is offset aft the steering column axis. A belt links rotation of the steering column to rotation of the wheel assemblies and in combination with the offset causes the belt to extend around at least half a circumference of each pulley for enhancing frictional contact. A shield guards each pulley. Mating alignment disks for aligning each assembly are provided to permit wheel alignment without affecting the belt tension. A third wheel assembly optionally extends from the column.

24 Claims, 12 Drawing Sheets

(56) References Cited

U.S. PATENT DOCUMENTS

| | | | |
|---|---|---|---|
| 4,068,857 A | 1/1978 | Karlsson | |
| 4,867,188 A | 9/1989 | Reid | |
| 4,934,726 A * | 6/1990 | Daenens et al. | 280/408 |
| 5,174,593 A | 12/1992 | Chapman | |
| 5,411,035 A | 5/1995 | Stone | |
| 5,492,353 A | 2/1996 | Chapman | |
| 5,800,317 A | 9/1998 | Accetta | |
| 5,873,592 A * | 2/1999 | Daenens | 280/410 |
| 5,951,817 A | 9/1999 | Thomas | |
| 7,311,319 B1 | 12/2007 | Ortega | |
| 7,416,060 B2 | 8/2008 | Takizawa | |
| 7,780,180 B2 | 8/2010 | Hoepner et al. | |
| 7,976,049 B2 | 7/2011 | Chiu | |
| 7,980,572 B2 | 7/2011 | Bennett | |
| 9,033,352 B2 * | 5/2015 | Burns | 280/99 |
| 2004/0195794 A1 | 10/2004 | Fan | |
| 2006/0033297 A1 | 2/2006 | Miller | |
| 2007/0182116 A1 | 8/2007 | Davey et al. | |
| 2009/0058037 A1 | 3/2009 | Accetta | |
| 2011/0109058 A1 | 5/2011 | Janis et al. | |
| 2012/0186893 A1 * | 7/2012 | Kempf | 180/251 |
| 2012/0280467 A1 | 11/2012 | Walther et al. | |

* cited by examiner

KNEE WALKER HAVING ENHANCED STEERING AND STABILITY

CROSS-REFERENCE TO RELATED APPLICATION

This application is a Continuation-in-Part of U.S. application Ser. No. 13/645,048, having filing date of Oct. 4, 2012, the disclosure of which is hereby incorporated by reference in its entirety and all commonly owned.

FIELD OF THE INVENTION

The present invention generally relates to ambulatory devices and in particular to a knee walker for supporting the leg of an individual during convalescence.

BACKGROUND

As is well known in the art, in situations where an individual has damaged or had a surgical procedure on an ankle or foot, it is preferred medically to keep weight off the foot or ankle while recuperating. Traditionally, this has been achieved by the use of wheelchairs or crutches. However, wheelchairs can be undesirable for many reasons such as access. Also, not everyone is able to use crutches due to the possibility of weakness or inconvenience. Accordingly, a device known as a knee walker has been developed to support the injured leg while providing stability such that the individual may still move around on their own. By way of example, known knee walkers are disclosed in U.S. Pat. Nos. 4,867,188; 5,800,317; 7,311,319; 7,780,180 and US Patent Application Publication US 2012/0280467. While many knee walkers have appeared in the market place, there remain problems such as an inability to effectively steer the knee walker, especially on uneven terrain, and instability. Accordingly, it is desirable to have an improved knee walker.

SUMMARY

In one aspect, an embodiment of the invention provides a knee walker comprising a frame, at least two ground-engaging wheels at a front portion of the frame and a steering column operable with a steering linkage, herein described as a belt, by way of non-limiting example, linking the steering column to the two front wheels, wherein the two front wheels are configured to be steered in response to rotation of the steering column and consequent rotation of the belt. Each front wheel is pivotable relative to the frame about a vertical axis.

The steering column is rotatably attached to a forward portion of the frame and includes a steering pulley or sprocket affixed thereto and rotatable about a vertically disposed axis of rotation. First and second ground engaging wheel assemblies are rotatably carried by the frame, each of the first and second ground engaging wheel assemblies include a pulley rotatable about a vertically disposed axis of rotation for rotating the wheel assembly. The axis of rotation is longitudinally offset from the steering column axis of rotation. Linkage means may comprise a belt linking rotation of the steering column to rotation of the wheel assemblies, wherein the linkage means in combination with the offset is sufficient for having the belt contact at least half a circumference of each pulley, thus enhancing frictional contact therewith.

In use, an individual may rest a knee on a seat carried by the frame and grasp the steering column using handlebars attached thereto to steer the knee walker. The steering belt enables no loss of steering even on uneven terrain as a result of both front wheels being steered simultaneously.

Belt pulley tensioners for adjusting the tension in the belt may be provided and may take the form of pulley wheels around which the belt is fitted. The belt tensioner pulleys may change the angle of the belt by more than 90 degrees from one side of the belt tensioner to the other side. This allows for a wrap angle of greater than 90 degrees enabling effective tensioning.

The belt may have teeth and each of the two front wheels may include toothed drive cogs for engagement by the toothed belt. Alternatively, a smooth belt may be employed with no toothed cogs. The two front wheels include guides for the belt. The guides may be the toothed drive cogs. The belt wraps around and contacts each guide or pulley for more than half of its circumference. This enables effective steering and reduces the chance of slipping especially with smooth (non-toothed) belts.

The centre of rotation of the steering column may be off-set from an imaginary line drawn between the centre of rotation of each of the front wheels. The steering column may be forward of this imaginary line such that each front wheel is behind the steering column. This allows for a reduced turning circle. In fact, in one embodiment, the knee walker may turn through 90 degrees with a desirable turning circle of approximately three feet.

The knee walker may further include two rear wheels approximately at each rear corner of the frame. Each rear wheel may be fixed about a vertical axis such that each is non-pivotable about its respective vertical axis. However, in one embodiment it is possible that the rear wheels are also freely pivotable about a vertical axis.

The frame may comprise two side members extending from one end of the knee walker to the other and a front cross member provided at one end of the two side members. The front cross member may accommodate the steering column and the two front wheels; the rear wheels may be supported on an axle arranged between the two side members at the other end of the two side members.

The side members may include a pivot about which each side member is foldable such that the rear wheels may be movable towards the front wheels so that the volume required to accommodate the knee walker may be reducible for storage when not in use. This allows less packaging than otherwise as well as ease of storage.

The seat may comprise a seat pad and a dependent seat post for adjustably fixing the seat to the frame, wherein the seat pad may be offset relative to the seat post such that it may be asymmetrical relative to the seat post so that in use the seat pad may be alignable to the left or the right of an imaginary centre line of the knee walker for accommodating a left or right knee. In this regard, the centre line may extend from between the two front wheels to between the two rear wheels. The seat pad may thus extend more towards the right or left of the centre line.

The steering column may include a pivot point for folding the steering column down when not in use. This may take the form of opposing teeth provided on opposing members each rotatable relative to the other one and releasably lockable to one another by means of a clamping mechanism.

The knee walker may include at least one brake. This may be controlled by a lever mounted on the steering column and/or the handlebars attached thereto, connected to the brake by a control wire in a similar manner to that found on bicycles.

The brakes may be rear disc brakes. The brake may be a parking brake. Alternatively a parking brake may be provided in addition to the disc brakes.

The steering column may be lockable in position such that it cannot rotate about its longitudinal axis. This may be provided by a pin extendable and retractable through a hole provided in a socket in which the steering column connects to the front cross member and a corresponding pin-receiving hole provided in the steering column. To lock the steering column the pin is extended through the hole into the pin-receiving hole such that the steering column cannot rotate relative to the socket provided on the front cross-member. However, other ways of locking the steering column are contemplated such as a clamp.

The knee walker may be collapsible or foldable to reduce its volume during period of non-use.

The steering of both front wheels simultaneously may permit a sharp angled (for example 90 degrees) turn to be effected with no loss of stability. Steering may be more finely controlled than with only one wheel being steered, especially on slopes or uneven ground.

BRIEF DESCRIPTION OF DRAWINGS

Embodiments of the invention are described by way of example with reference to the accompanying drawings in which.

DETAILED DESCRIPTION OF EMBODIMENTS

Figure 1:
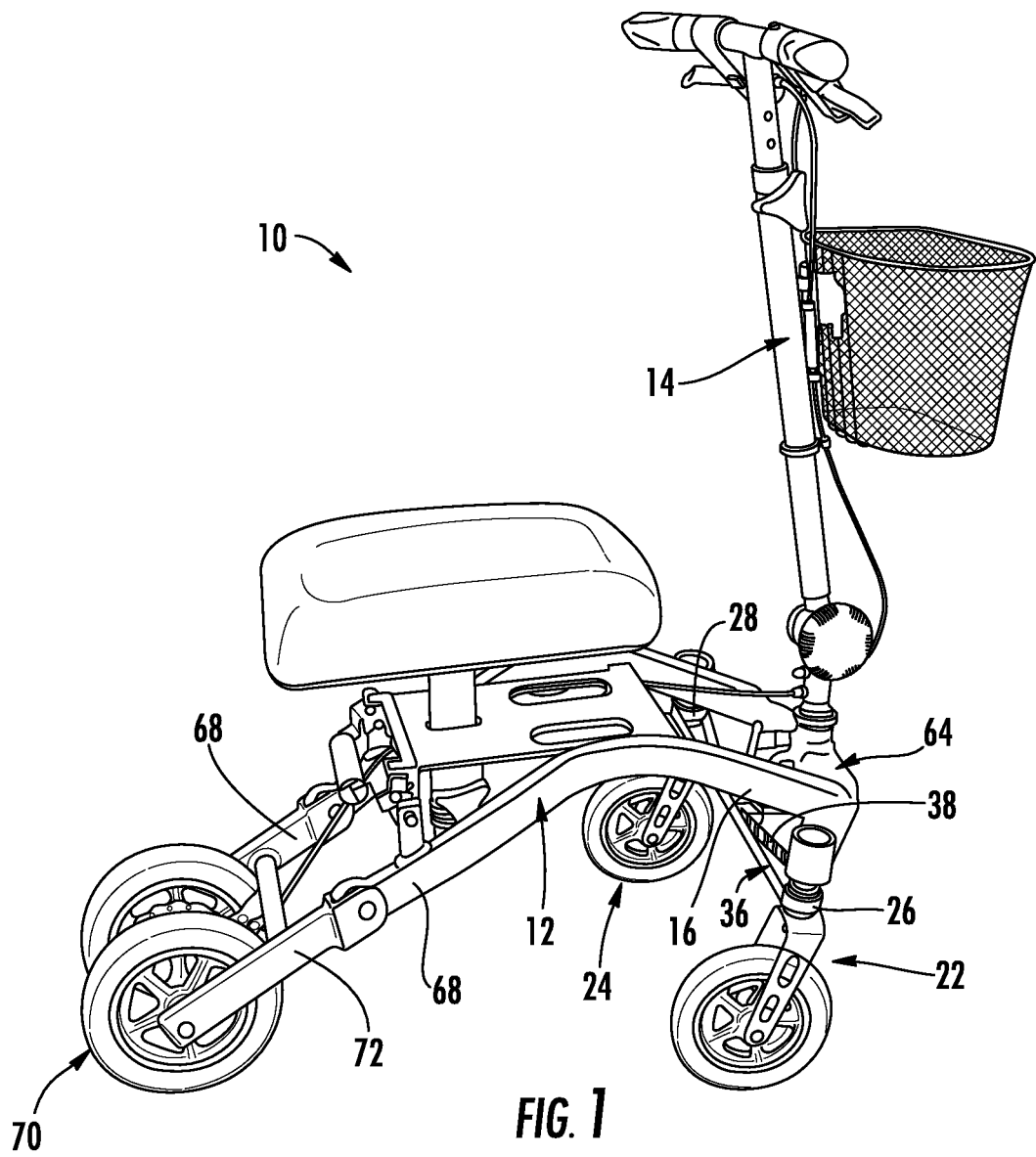
FIG. 1 is a right side perspective view of a knee walker according to one embodiment of the invention.
Figure 2:
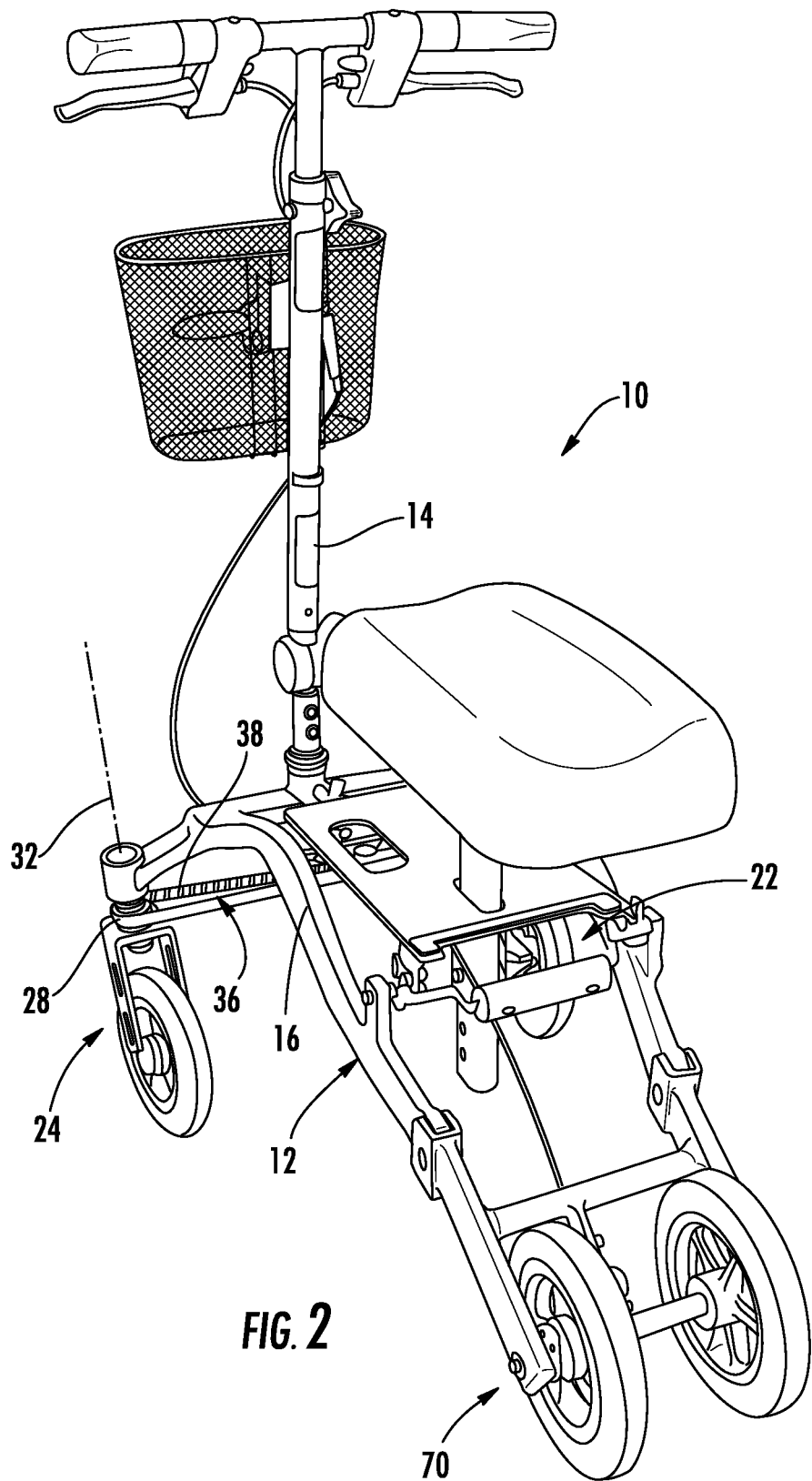
FIG. 2 is a left rear perspective view of the knee walker of FIG. 1.
Figure 3:
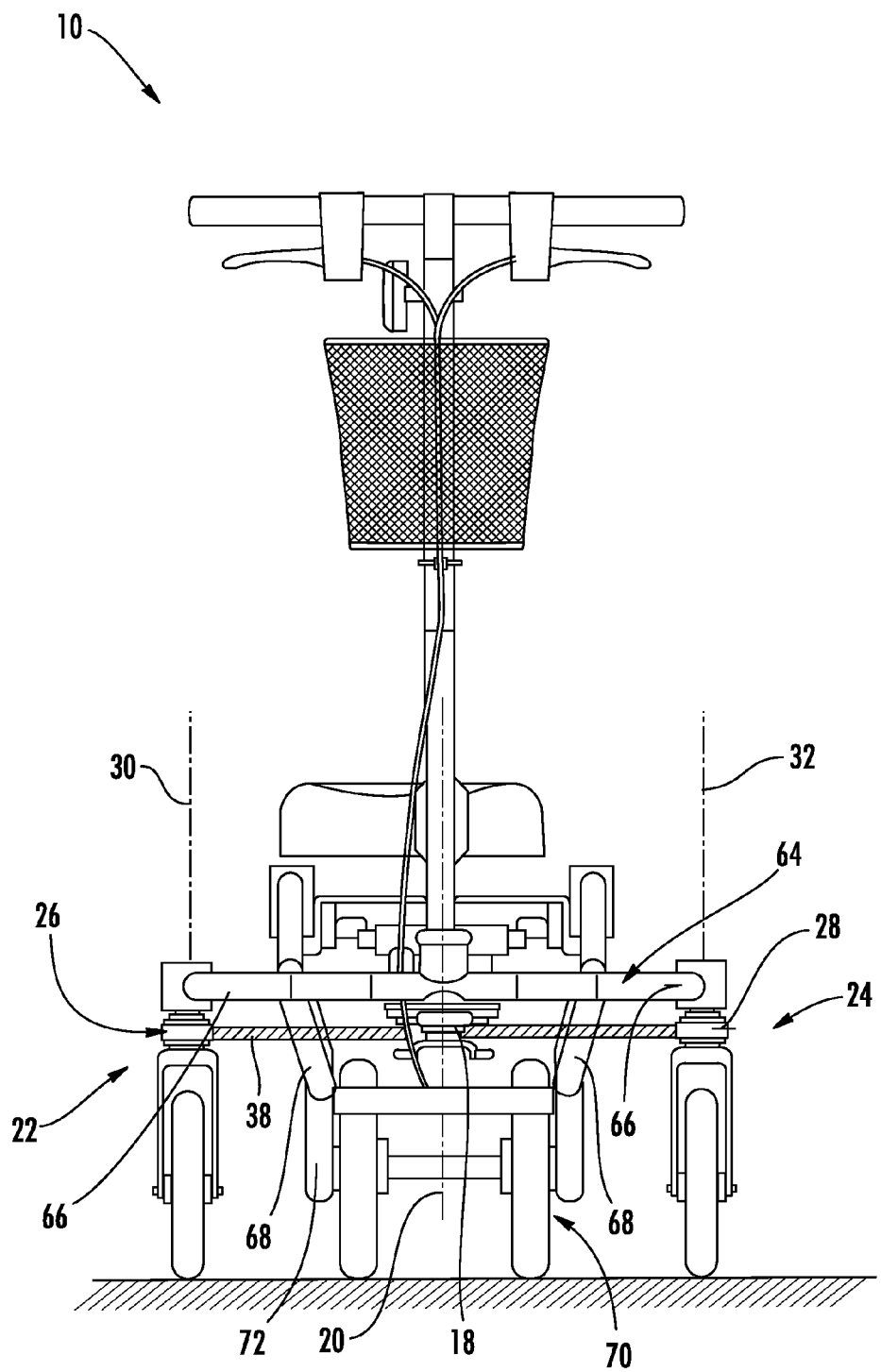
FIG. 3 is a front elevation view of the knee walker of FIG. 1.
Figure 4:
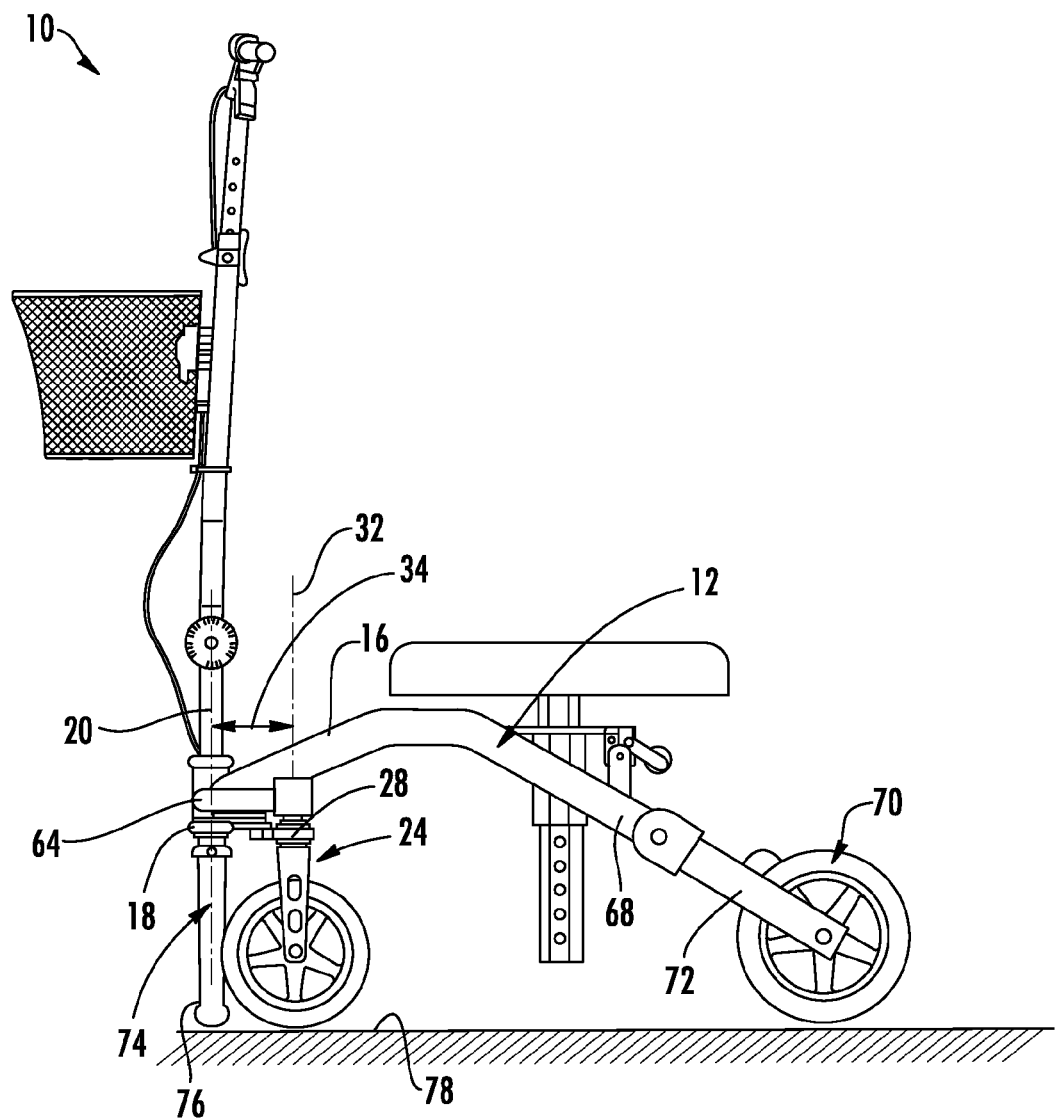
FIG. 4 is a left side elevation view of the knee walker of FIG. 1.
Figure 5:
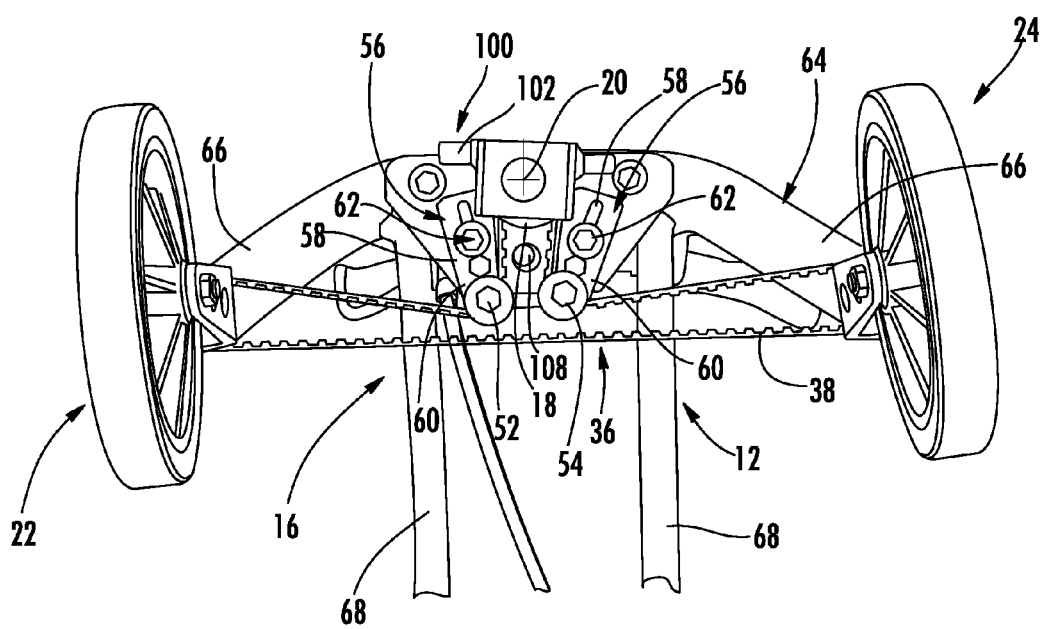
FIG. 5 is a bottom view of a front portion of the knee walker of FIG. 1.

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics of any embodiment or aspect of the invention may be combined in any suitable manner, as would be apparent to one of ordinary skill in the art from this disclosure, in one or more embodiments. Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention. Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination. In the description provided herein, numerous specific details are set forth. However, it is understood that embodiments of the invention may be practiced without these specific details. In other instances, well-known methods, structures and techniques have not been shown in detail in order not to obscure an understanding of this description. In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value. The use of the term "at least one" may, in some embodiments, mean only one. The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

With reference initially to FIGS. 1-5, a knee walker 10 according to the teachings of the present invention comprises a frame 12 and a steering column 14 rotatably attached to a forward portion 16 of the frame. The steering column 14 includes a steering sprocket or pulley 18 affixed thereto and rotatable about a vertically disposed axis 20 of rotation for the steering column. First and second ground engaging wheel assemblies 22, 24 are rotatably carried by the frame 12. Each of the first and second ground engaging wheel assemblies 22, 24 has a sprocket or pulley 26, 28 rotatable, respectively, about a vertically disposed axis 30, 32 of rotation for rotating the respective wheel assembly. With continued reference to FIG. 4, the axes 30, 32 of rotation are longitudinally offset 34 from the steering column axis 20 of rotation. With continued reference to FIGS. 1-3, linkage means 36 including a belt 38 links rotation of the steering column 14 to rotation of the wheel assemblies 24, 26, wherein the linkage means in combination with the offset 34 maintains contact of the belt with at least half a circumference of each pulley 18, 26, 28, thus enhancing frictional contact therewith. As will be well understood by those of ordinary skill in the art, the linkage means 36 may employ the belt 38, as herein described by way of non-limiting example, or a chain, band, strap, string, and similar restraints without departing from the teachings of the present invention.

As illustrated again with reference to FIG. 4, the axes 32 (34 hidden from view) of rotation of the wheel assemblies 24 (22 hidden from view) are aft the axis 20 of rotation of the steering column 14.

With continued reference to FIGS. 1-4, each wheel assembly 22, 24 comprises a vertically disposed shaft 40 having the respective pulley 26, 28 affixed to a proximal end 42 thereof. A fork 44 extends from the shaft 40 at a distal end 46 thereof. A wheel 48 is freely rotatable about a horizontal axle 50 carried by the fork 44.

Figure 6:
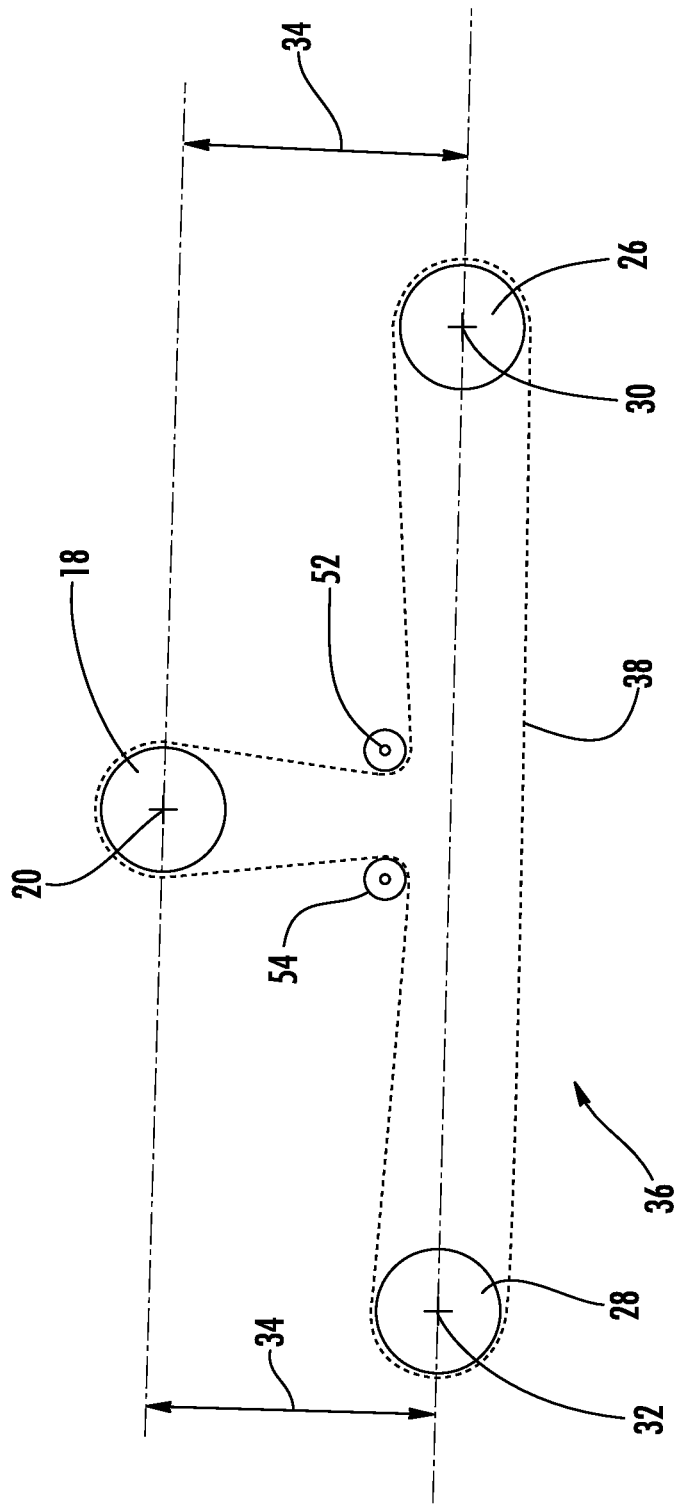
FIG. 6 is a diagrammatical illustration of a linkage means including a belt operable with steering column and wheel assembly pulleys.

With reference again to FIG. 5, the linkage means 36 comprises first and second tensioning rollers 52, 54 operable proximate the steering pulley 18 for receiving the belt 38 therefrom and maintaining the belt in tensioned contact with the pulleys 18, 26, 28, as earlier described and as further diagrammatically illustrated with reference to FIG. 6. FIG. 6 further illustrates the linkage means 36 including the rollers 52, 54 in combination with the offset 34 maintaining contact of the belt 38 with at least half the circumference of each pulley 18, 26, 28 for enhancing frictional contact between the pulleys and the belt. With continued reference to FIG. 5, a tensioning adjustment assembly 56 is operable with each of the tensioning rollers 52, 54. For the embodiment herein described by way of example, the tensioning assembly 56 comprises a plate 58 slidably affixed to the frame 12, wherein a proximal end 60 of the arm is operable with the tensioning pulley 52, 54. The plate 58 is frictionally securable to the frame 12 using bolts 62, by way of non-limiting example.

With continued reference to FIG. 5 and again to FIG. 1, by way of example, the frame comprises a front cross member 64, wherein the first and second ground engaging wheel assemblies 22, 24 are carried by outboard ends 66 of the cross member. For the embodiment herein described by way of non-limiting example, the front cross member 64 includes a bow shape having the steering column 14 operable at a center portion thereof and the ground engaging wheel assemblies 2, 24 carried at outboard portions thereof. A pair of side members 68 extends rearward from the front cross member 64. Rear wheels 70 are attached to rearmost portions 72 of the side members 68.

Figure 7:
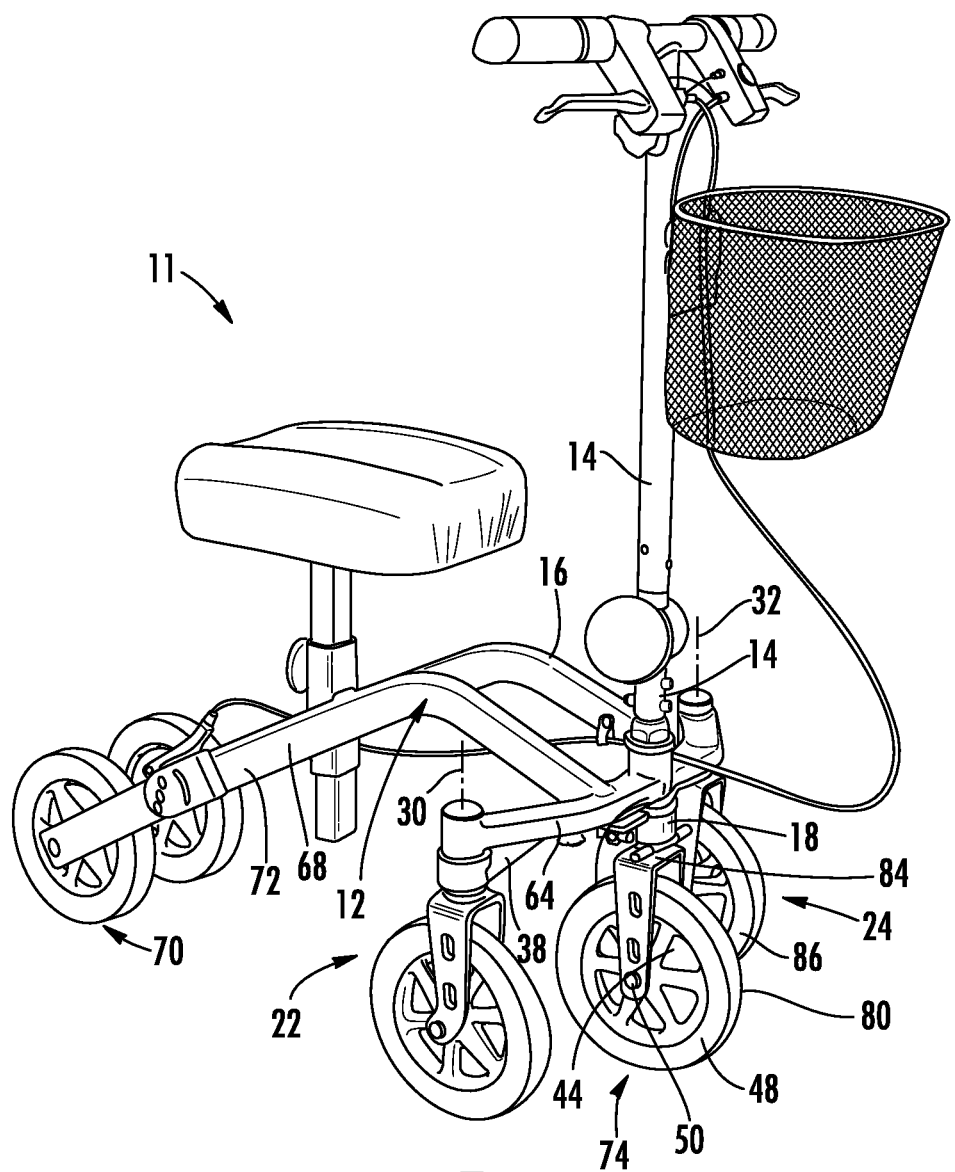
FIG. 7 a right side perspective view of an improved knee walker according to the teachings of the present invention.
Figure 8:
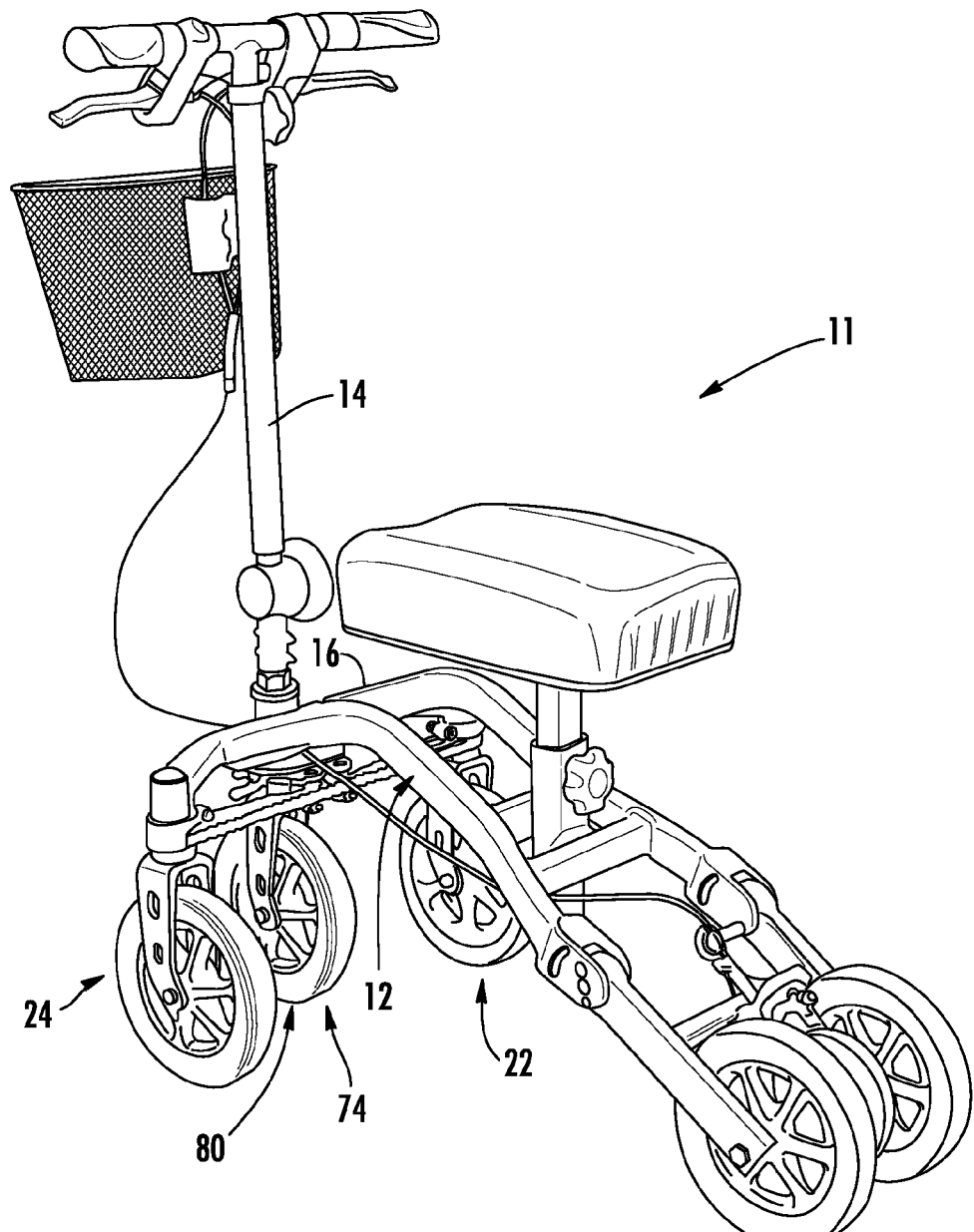
FIG. 8 is a left rear perspective view of the knee walker of FIG. 7.
Figure 9:
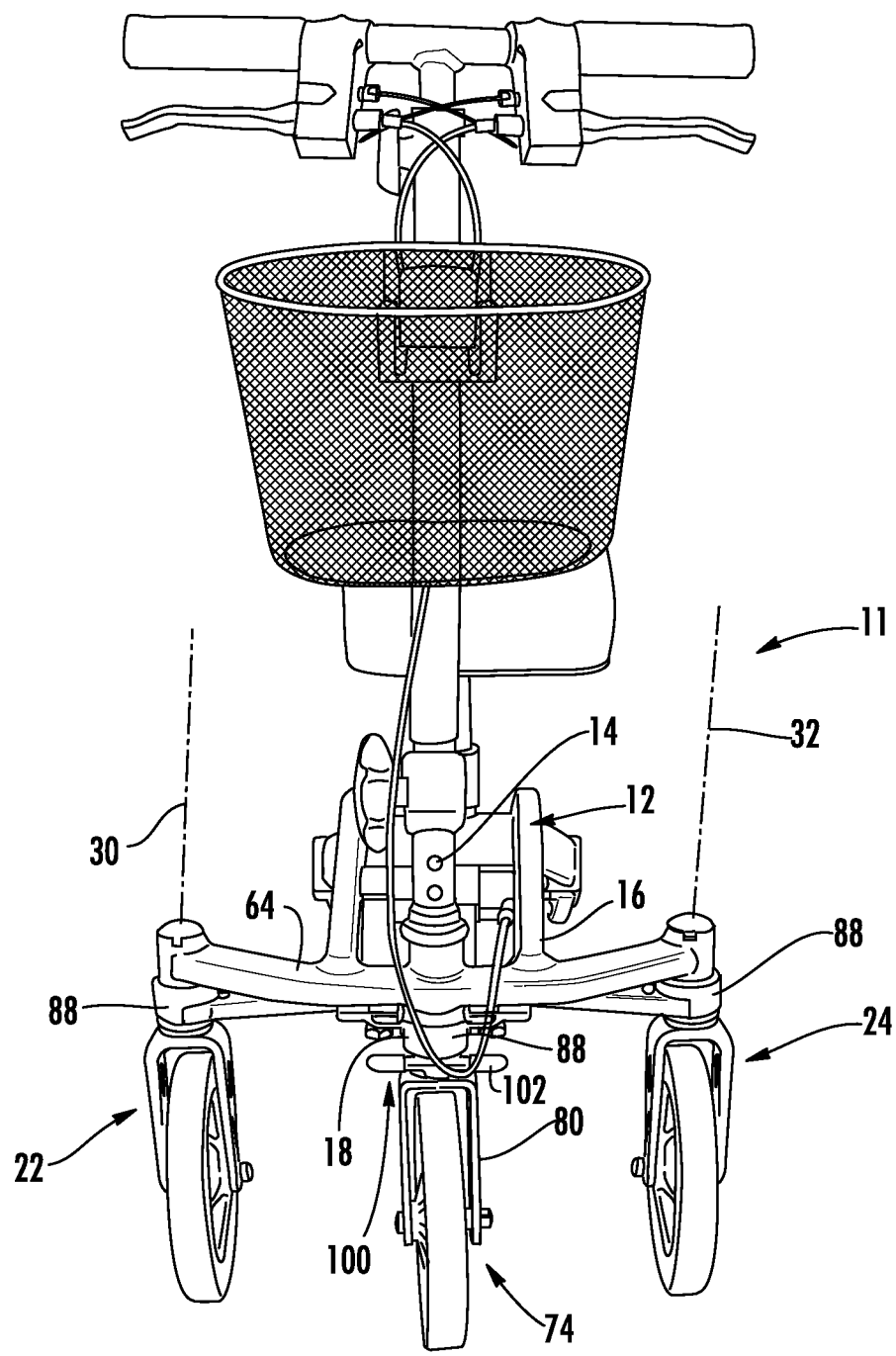
FIG. 9 is a front elevation view of the knee walker of FIG. 7.

Improvements have been made to the above described knee walker 10 earlier disclosed in related U.S. patent application Ser. No. 13/645,048, the disclosure of which is incorporated by reference in its entirety. Reference is now made to FIGS. 7, 8 and 9 directed to an improved knee walker 11 which may be described as the knee walker 10 including the frame 12 and the steering column 14 rotatably attached to a forward portion 16 of the frame. The steering column 14 includes a steering sprocket or pulley 18 affixed thereto and rotatable about a vertically disposed axis 20 of rotation for the steering column. First and second ground engaging wheel assemblies 22, 24 are rotatably carried by the frame 12. Each of the first and second ground engaging wheel assemblies 22, 24 has a sprocket or pulley 26, 28 rotatable, respectively, about a vertically disposed axis 30, 32 of rotation for rotating the respective wheel assembly. The axes 30, 32 are longitudinally offset 34 from the steering column axis 20 of rotation. Yet further, the linkage means 36 includes a continuous belt 38 connected for rotation of the steering column 14 and the wheel assemblies 24, 26. The linkage means in combination with the offset 34 maintains contact of the belt with at least half a circumference of each pulley 18, 26, 28, as above presented. As indicated in the figures herein presented, common elements are identified with similar reference numeral.

With continued reference to FIGS. 7-9, the knee walker 11 further comprises an extension element 74 extending downwardly from the steering column 14 or the frame 12. As illustrated with reference again to FIG. 4, the extension element 74 formed as a shaft 76 may extend to proximate a ground surface 78 contacted by the ground engaging wheel assemblies 22, 24 and rear wheels 70 or may comprise a third ground engaging wheel assembly 80, as illustrated in FIGS. 7-9. As in the case of the wheel assemblies 22, 24 above described, the third ground engaging wheel assembly 80 may have a similar construction and comprise a third vertically disposed axle 82 having a proximal end 84 affixed to the steering column pulley 18, to the frame 12, and optionally freely rotating as may be desired, or optionally or may be freely rotatable. For the embodiment herein described by way of example, the third wheel assembly 80 is operably with the steering column 14 and the axle 82 fixed thereto. With continued reference to FIG. 7, by way of example, the third wheel assembly 80 comprises a fork 44 extending from the third axle 82 at a distal end 86 thereof, and a wheel 48 freely rotatable about a horizontal axle 50 carried by each fork.

Figure 10:
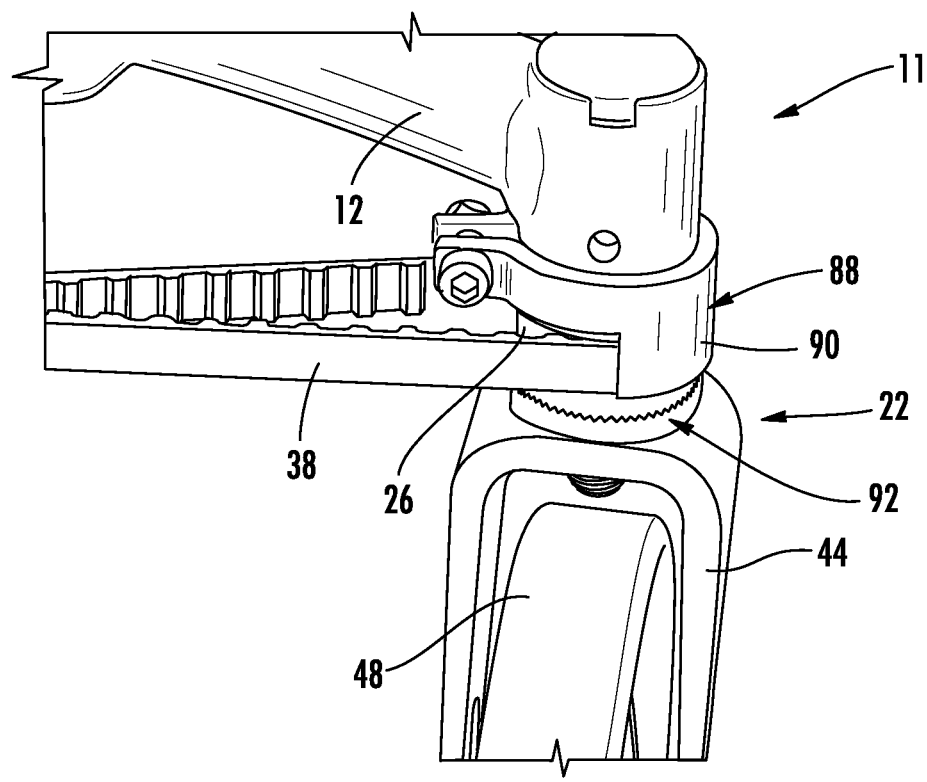
FIG. 10 is a partial perspective view of a right side wheel assembly for the embodiment of FIG. 7.

With reference again to FIG. 9 and now to FIG. 10, the knee walker 11 further comprises arcuate shields 88 carried by the frame proximate each of the pulleys 18, 26, 28, wherein each shield extends at least partially around each of the pulleys on outward sides of the pulleys. The shields 88 have been shown to protect the belt and prevent the belt from being forced out of desired engagement with the belt 38. Dislodging a belt from its sprocket or pulley can result when another wheel is turning while the one wheel is undesirably fixed in place.

Figure 11:
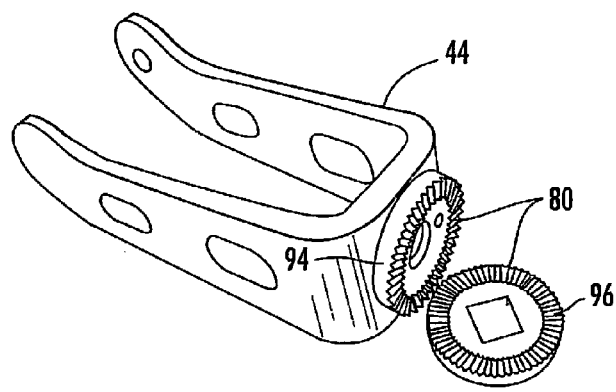
FIG. 11 is a perspective view of a wheel alignment assembly.
Figure 11A:
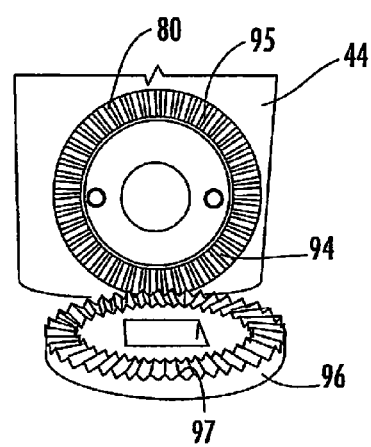
FIGS. 11A and 11B are perspective views of portions of the alignment assembly of FIG. 11.
Figure 11B:
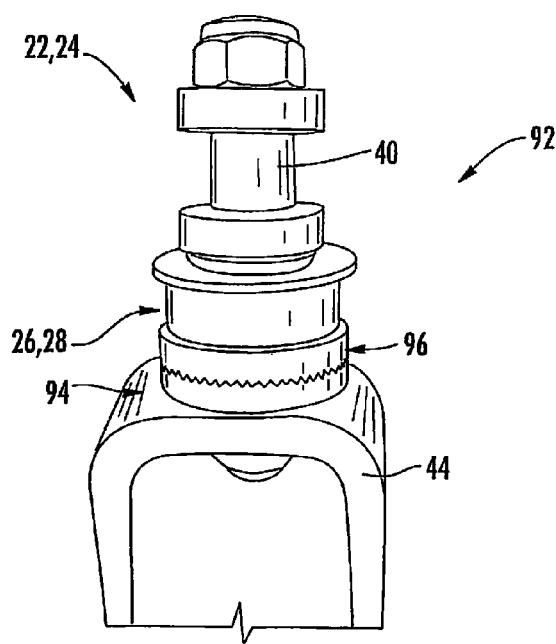

With continued reference to FIG. 10, and now to FIG. 11, the knee walker 11 comprises a wheel alignment assembly 92 formed with each of the wheel assemblies 22, 24. Optionally, the wheel assembly 80 may be freely rotatable about the column axis 20 or may be rotatably operable with the first and second wheel assemblies, as desired. With continued reference to FIG. 11 and now to FIGS. 11A and 11B, the wheel alignment assembly 92 comprises a first (lower) alignment disk 94 extending around the shaft 40 of each wheel assembly 22, 24, 80. The first alignment disk 94 is affixed to the fork 44. A second (upper) alignment disk 96 extends around the shaft 40 and is frictionally affixed to the sprocket or pulley 18, 26, 28. Opposing faces 95, 97 of each alignment disk 94, 96 respectively include a plurality of notches 98 in mating relationship. By way of example, an alignment of the first and second wheel assemblies 22, 24, and third wheel assembly 80 when employed, is adjusted by separating the opposing disks 94, 96, rotating one relative to the other, and affixing them together in the mating relationship. By way of non-limiting example, and with continued reference to FIGS. 11A and 11B, the first alignment disk includes a circular hole for rotating about the shaft and the second alignment disk has a square hole for preventing rotation about the shaft. It will be appreciated by those skilling in the art that the arrangement of the alignment disks 94, 96 as herein described desirably enables the forks to be aligned without affecting the belt or belt tension.

Figure 12:
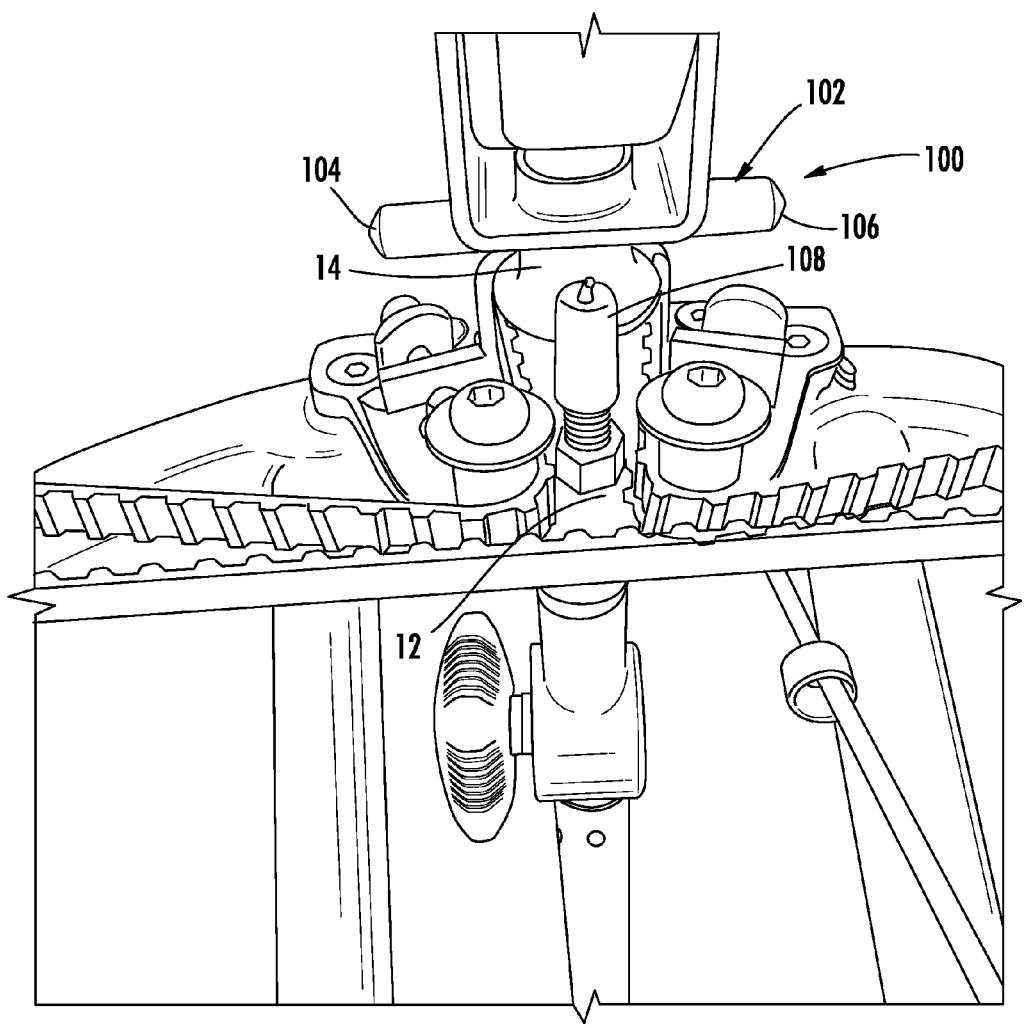
FIG. 12 is a partial bottom perspective view of a front portion of the embodiment of FIG. 7.

With reference again to FIGS. 5 and 9, by way of example, and now to FIG. 12, a stop 100 is provided for limiting rotation of the ground engaging wheel assemblies 22, 24 to orthogonal directions (90 Degrees) from a forward direction thereof. The stop 100, as herein presented by way of non-limiting example, comprises a rod 102 extending outwardly from the steering column 14 and rotatable therewith. The rod 102 has a first free end 104 opposing a second free end 106. A post 108 is fixed to the frame 12 and positioned proximate the steering column 14, wherein a clockwise rotation of the steering column results in contact of the first end 104 of the rod 102 with the post 108, and a counterclockwise rotation of the steering column 14 results in contact of the second end 106 of the rod 102 with the post 108. As illustrated with continued reference to FIG. 12, the rod 102 is positioned on an opposing side of the steering column axis 20 of rotation than the post 108.

Although the invention has been described relative to various selected embodiments herein presented by way of example, there are numerous variations and modifications that will be readily apparent to those skilled in the art in light of the above teachings. It is therefore to be understood that, within the scope of the claims hereto attached and supported by this specification, the invention may be practiced other than as specifically described.

That which is claimed is:

1. A knee walker comprising:
   a frame;
   a steering column rotatably attached to a forward portion of the frame, the steering column having a steering pulley affixed thereto and rotatable about a vertically disposed axis of rotation;
   first and second ground engaging wheel assemblies rotatably carried by the frame, each of the first and second ground engaging wheel assemblies having a pulley rotatable about a vertically disposed axis for rotating the wheel assembly, wherein the vertically disposed axis of each of the first and second ground engaging wheel assemblies is orthogonally offset from the axis of rotation of the steering column;
   a linkage operable with the pulleys for linking rotation of the steering column to rotation of the wheel assemblies, wherein the linkage contacts at least half a circumference of each pulley, thus enhancing frictional contact therewith; and
   at least one tension roller operable proximate the steering pulley for receiving the linkage therefrom and maintaining the linkage in tensioned contact with the pulleys.

2. The knee walker according to claim 1, wherein the axes of rotation of the wheel assemblies are aft the axis of rotation of the steering column.

3. The knee walker according to claim 1, further comprising arcuate shields carried by the frame proximate each of the pulleys, wherein each shield extends at least partially around each of the pulleys on outward sides thereof.

4. The knee walker according to claim 1, further comprising a tensioning adjustment assembly operable with the at least one tension roller.

5. The knee walker according to claim 4, wherein the tensioning assembly comprises a plate slidably affixed to the frame, wherein a proximal end of the plate is operable with one tensioning roller, and wherein the plate is frictionally securable to the frame.

6. The knee walker according to claim 1, further comprising a stop fixed for limiting rotation of the ground engaging wheel assemblies to orthogonal directions from a forward direction thereof.

7. The knee walker according to claim 6, wherein the stop comprises:
   a rod extending outwardly from the steering column and rotatable therewith, wherein the rod has a first free end opposed from a second free end; and
   a post fixed to the frame and positioned proximate the steering column, wherein a clockwise rotation of the steering column results in contact of the first end of the rod with the post, and a counterclockwise rotation of the steering column results in contact of the second end of the rod with the post.

8. The knee walker according to claim 1, wherein the linkage is selected from a group consisting of a belt, a band, a chain, a string and a strap.

9. The knee walker according to claim 1, further comprising an extension element extending downwardly from at least one of the steering column and the frame, wherein the extension element extends to at least one of proximate a ground surface contacted by the ground engaging wheel assemblies and in contact with the ground surface.

10. The knee walker according to claim 1, wherein the frame comprises:
    a front cross member, wherein the first and second ground engaging wheel assemblies are carried by outboard ends thereof;
    a pair of side members extending rearward from the front cross member; and
    rear wheels attached to rearmost portions of the side members.

11. The knee walker according to claim 10, wherein the front cross member includes a bow shape having the steering column operable at a center portion thereof and the ground engaging wheel assemblies are carried at outboard portions thereof.

12. The knee walker according to claim 1, wherein the first and second ground engaging wheel assemblies further comprise:
    a vertically disposed shaft having one pulley affixed to a proximal end thereof, a fork extending from the shaft at a distal end thereof, and a wheel freely rotatable about a horizontal axle carried by each fork;

a first alignment disk extending around the shaft of each wheel assembly, the first alignment disk affixed to the fork; and a second alignment disk extending around the shaft, the second alignment disk frictionally affixed to the pulley, wherein opposing faces of each alignment disk include a plurality of notches in mating relationship, and wherein an alignment of the first and second wheel assemblies is adjusted by separation of the opposing disks, a rotation thereof, and an affixing of each thereto.

13. A knee walker comprising:

a frame;

a steering column rotatably attached to a forward portion of the frame, the steering column having a steering pulley affixed thereto and rotatable about a vertically disposed axis of rotation;

first and second ground engaging wheel assemblies rotatably carried by the frame, each of the first and second ground engaging wheel assemblies having a pulley rotatable about a vertically disposed axis for rotating the wheel assembly, wherein the vertically disposed axis of each of the first and second ground engaging wheel assemblies is orthogonally offset from the axis of rotation of the steering column, and wherein each wheel assembly comprises a vertically disposed shaft having one pulley affixed to a proximal end thereof, a fork extending from the shaft at a distal end thereof, and a wheel freely rotatable about a horizontal axle carried by each fork;

a first alignment disk extending around the shaft of each wheel assembly, the first alignment disk affixed to the fork;

a second alignment disk extending around the shaft, the second alignment disk frictionally affixed to the pulley, wherein opposing faces of each alignment disk include a plurality of notches in mating relationship, and wherein an alignment of the first and second wheel assemblies is adjusted by separation of the opposing disks, a rotation thereof, and an affixing of each thereto; and a linkage operable with the pulleys for linking rotation of the steering column to rotation of the wheel assemblies, wherein the linkage contacts at least half a circumference of each pulley, thus enhancing frictional contact therewith.

14. The knee walker according to claim 13, further comprising a stop fixed for limiting rotation of the ground engaging wheel assemblies to orthogonal directions from a forward direction thereof.

15. The knee walker according to claim 13, further comprising at least one tension roller operable proximate the steering pulley for receiving the linkage therefrom and maintaining the linkage in tensioned contact with the pulleys.

16. A knee walker, comprising:

a frame;

a steering column rotatably attached to a forward portion of the frame, the steering column having a steering pulley affixed thereto and rotatable about a vertically disposed axis of rotation;

first and second ground engaging wheel assemblies rotatably carried by the frame, each of the first and second ground engaging wheel assemblies having a pulley rotatable about a vertically disposed axis for rotating the wheel assembly, wherein the vertically disposed axis of each of the first and second ground engaging wheel assemblies is orthogonally offset from the axis of rotation of the steering column;

an extension element extending downwardly from the steering column, wherein the extension element extends to at least one of proximate a ground surface contacted by the ground engaging wheel assemblies and in contact with the ground surface; and a linkage operable with the pulleys for linking rotation of the steering column to rotation of the wheel assemblies, wherein the linkage contacts at least half a circumference of each pulley, thus enhancing frictional contact therewith.

17. A knee walker comprising:

a frame;

a steering column rotatably attached to a forward portion of the frame, the steering column having a steering pulley affixed thereto and rotatable about a vertically disposed axis of rotation;

first and second ground engaging wheel assemblies rotatably carried by the frame, each of the first and second ground engaging wheel assemblies having a pulley rotatable about a vertically disposed axis for rotating the wheel assembly, wherein the vertically disposed axis of each of the first and second ground engaging wheel assemblies is orthogonally offset from the axis of rotation of the steering column;

an extension element extending downwardly from at least one of the steering column and the frame, wherein the extension element extends to at least one of proximate a ground surface contacted by the ground engaging wheel assemblies and in contact with the ground surface, wherein the extension element comprises a third ground engaging wheel assembly, and wherein the third ground engaging wheel assembly comprises a third vertically disposed axle having a proximal end connected to the steering column, a fork extending from the third axle at a distal end thereof, and a wheel freely rotatable about a horizontal axle carried by each fork; and a linkage operable with the pulleys for linking rotation of the steering column to rotation of the wheel assemblies, wherein the linkage contacts at least half a circumference of each pulley, thus enhancing frictional contact therewith.

18. A knee walker comprising:

a frame;

a steering column rotatably attached to a forward portion of the frame, the steering column having a steering pulley affixed thereto and rotatable about a vertically disposed axis of rotation;

first and second ground engaging wheel assemblies rotatably carried by the frame and aligned generally orthogonal thereto, each of the first and second ground engaging wheel assemblies having a pulley rotatable about a vertically disposed axis of rotation for rotating the wheel assembly, wherein the axes of rotation of the wheel assemblies are offset aft the steering column axis of rotation; and linkage operable with the steering column for transferring rotation thereof to the wheel assemblies, wherein the linkage includes first and second tension rollers operable for receiving the linkage and maintaining the linkage in tensioned contact with the pulleys, and wherein in combination with the offset is sufficient for having the linkage contact at least half a circumference of each pulley, thus enhancing frictional contact therewith.

19. The knee walker according to claim 18, wherein each wheel assembly comprises:

a vertically disposed shaft having one pulley affixed to a proximal end thereof;

a fork extending from the shaft at a distal end thereof; and a wheel freely rotatable about a horizontal axle carried by each fork.

20. The knee walker according to claim 19, further comprising:

a first alignment disk extending around the shaft of each wheel assembly, the first alignment disk affixed to the fork; and a second alignment disk extending around the shaft, the second alignment disk frictionally affixed to the pulley, wherein opposing faces of each alignment disk include a plurality of notches in mating relationship, and wherein an alignment of the first and second wheel assemblies is adjusted by separation of the opposing disks, a rotation thereof, and an affixing of each thereto.

21. The knee walker according to claim 18, further comprising arcuate shields carried by the frame proximate each of the pulleys, wherein each shield extends at least partially around each of the pulleys on outward sides thereof.

22. The knee walker according to claim 18, further comprising a stop operable between the steering column and the frame for limiting rotation of the ground engaging wheel assemblies.

23. The knee walker according to claim 18, further comprising a third ground engaging means extending downwardly from at least one of the steering column and the frame, wherein the third ground engaging means extends to at least one of proximate a ground surface contacted by the ground engaging wheel assemblies and in contact with the ground surface.

24. The knee walker according to claim 18, wherein the linkage is selected from a group consisting of a belt, a band, a chain, a string and a strap.

* * * * *